United States Patent [19]

Schillerstrom et al.

[11] 4,326,369
[45] Apr. 27, 1982

[54] APPARATUS FOR CHECKING THE SPINDLE PLANE ON A COTTON HARVESTER

[75] Inventors: Merl S. Schillerstrom, Des Moines; Robert A. Tufts, Bondurant, both of Iowa

[73] Assignee: Deere & Company, Moline, Ill.

[21] Appl. No.: 170,407

[22] Filed: Jul. 21, 1980

[51] Int. Cl.³ .................................... A01D 46/16
[52] U.S. Cl. .................................... 56/41; 33/172 B; 33/172 C
[58] Field of Search ................ 56/41, 42, 43, 44, 45, 56/46, 47, 50; 33/172 B, 172 C

[56] References Cited

U.S. PATENT DOCUMENTS

| | | | |
|---|---|---|---|
| 1,723,529 | 8/1929 | Schwieterman | 33/172 D |
| 2,209,628 | 7/1940 | Munson | 33/172 B |
| 3,237,311 | 3/1966 | Schumacher | 33/172 |
| 3,765,098 | 10/1973 | Schafer | 33/172 B |
| 3,844,045 | 10/1974 | Farman | 33/125 R |
| 4,142,295 | 3/1979 | Nishina et al. | 33/172 B |

FOREIGN PATENT DOCUMENTS 664604  5/1979  U.S.S.R. .................................... 56/50

OTHER PUBLICATIONS

John Deere Technical Manual 1105, Cotton Pickers 9900 and 9910, Jul. 1978.

Primary Examiner—Paul J. Hirsch

[57] ABSTRACT

A fluid comparator assembly which is clamped to the floor of a cotton harvesting unit and includes an arm for contacting the top of a spindle. The arm is operably connected to a fluidfilled cylinder communicating with a gauge. As the picker bar drum is rotated and a different spindle contacts the arm, any deviation in spindle height will be indicated by a change in fluid column height on the gauge. The cross-sectional area of the cylinder is much greater than that of the gauge column so a small deviation in spindle height results in a large, easily readable change in fluid column height. Each spindle bar is shimmed so that the maximum deviation as indicated by the change in column height is within the desired tolerance.

15 Claims, 3 Drawing Figures

4,326,369

APPARATUS FOR CHECKING THE SPINDLE PLANE ON A COTTON HARVESTER

BACKGROUND OF THE INVENTION

The present invention relates generally to cotton harvesters and more specifically to a method and apparatus for checking the spindle plane on a cotton harvester.

In a conventional cotton harvester, picker drums carry rotating spindles mounted in columns on vertical bars. The spindles remove cotton from the cotton plants, and rotating doffer columns doff the cotton from the spindles as the spindles pass under doffer pads. The vertical picker bars must be carefully adjusted so that the corresponding spindles on the bars are at the same height. If one picker bar is lower than the other, the spindles on that bar will pass too far below the doffer pads and will not doff properly. If one picker bar is higher than the others, the spindles on that bar will cause excessive wear on the doffer pads when the doffer column has been adjusted downwardly to doff the spindles on the other bars.

Typical of previously available devices for spindle plane adjustment is a dial indicator mounted on a bracket. A pair of holes in the bracket are placed over two of the upper spindles of the picker bar. A pin on the top of the dial indicator contacts a location on the center sheet of the picker unit housing above the picker drum. The indicator is set to a zero setting and removed from the spindles. Each bar is checked by placing the bracket over the spindles after the drum is revolved to the proper position.

Several problems exist with the previous devices and methods for the spindle plane adjustment. Each bar must be gauged at the same location on the center sheet since variations in readings occur for the same bar if the pin on the dial indicator changes location on the sheet. Any movement of the device affects the accuracy of the reading, and erroneous, non-repeatable measurement are often obtained which result in improper adjustment or unnecessary readjustment of the bar. Improper adjustment causes inefficient doffing and excessive doffer pad wear. Bars that are set correctly at the factory are often unnecessarily readjusted by the dealer or farmer resulting, added warranty costs as well as wasted time result simply because the presently available devices are not accurate and methods for spindle plane adjustment are not accurate or repeatable. The previous procedure is time-consuming because the indicator must be carefully repositioned on the spindles each time a different bar is gauged.

It is therefore an object of the present invention to provide an improved device and method for spindle plane adjustment on a cotton harvester.

It is another object of the invention to provide a device and method for spindle plane adjustment which eliminates improper adjustment and unnecessary readjustment of the picker bars.

It is yet another object to provide an easily readable gauge for quickly making highly accurate spindle plane adjustments for increased doffing efficiency and reduced doffer pad wear. It is still another object to provide such a gauge which facilitates repeatable measurements by different operators of the device to thereby reduce unnecessary readjustment of the picker bars.

It is yet another object to provide a spindle plane gauge which does not have to be repositioned for each spindle bar and which has an indicator which can be placed at a location remote from the spindles so that the operator can easily determine relative spindle height.

A fluid cylinder is connected to a base plate. An arm is pivoted to the base plate and has a spindle engaging end adopted to ride over the top of a preselected lower spindle of each picker bar and a cylinder end which displaces the piston in the cylinder as the spindle engaging end moves up and down. A clear, narrow gauge tube having a diameter much less than the diameter of the fluid cylinder is connected by fluid line to the cylinder at opposite sides of the piston so that small movement of the piston caused by pivoting of the arm is translated into a relatively large change in level of the fluid in the tube. The tube is supported vertically on a graduated gauge base so that the change in the height of the spindle from one picker bar to the next can be read directly by the change in fluid column height on the gauge. A small change in spindle height translates into a relatively large change in the fluid column height on the gauge. The gauge may be placed in any convenient location for easy reading by the operator.

The base plate is secured to the picker unit housing and the picker bar drum is rotated until a spindle on one of the bars is under the arm of the gauge. An adjusting knob on the cylinder end of the pivoting arm is turned until the fluid in the gauge reaches a preselected position, preferably at the zero location about midpoint on the graduated scale. The picker bar drum is then rotated a complete revolution, and a reading is taken at the spindle on each bar. The picker bars are shimmed to obtain as near zero deviation as possible. The operator does not have to reposition the device for each bar, and a complete check of spindle plane can be made quickly and easily.

These and other objects, features and advantages will become apparent to one skilled in the art from the following detailed description taken along with the drawings.

DESCRIPTION OF THE PREFERRED EMBODIMENT

Figure 1:
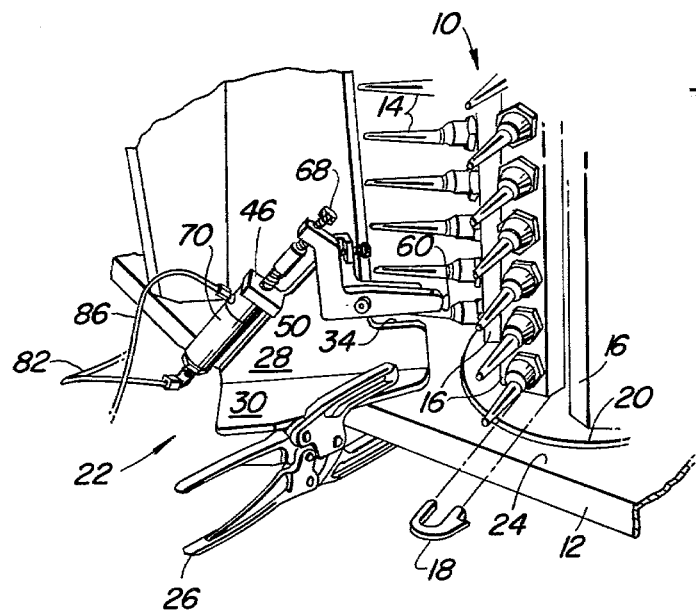
FIG. 1 is a perspective view of the device of the present invention supported on a harvesting unit.

Referring to FIG. 1, therein is shown a portion of a conventional picker bar drum 10 mounted for rotation in a row unit housing 12 of a cotton picker. Rotating spindles 14 are mounted in columns on vertical bars 16. Each vertical bar 16 is adjustable vertically with respect to the others by placing shims 18 between the bottom of the bar and a lower support plate 20 on the drum 10. The bars 16 must be carefully adjusted so that the corresponding spindles on the different columns are at the same height since improperly adjusted bars result in ineffective doffing and excessive doffer pad wear.

Figure 3:
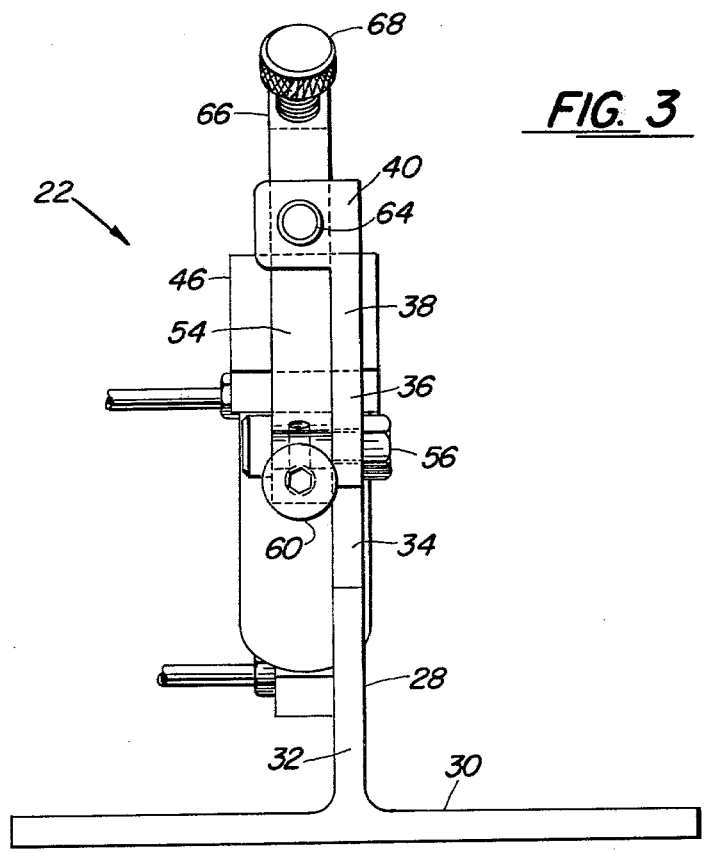
FIG. 3 is an end view of the device taken along lines 3—3 of FIG. 2.
Figure 2:
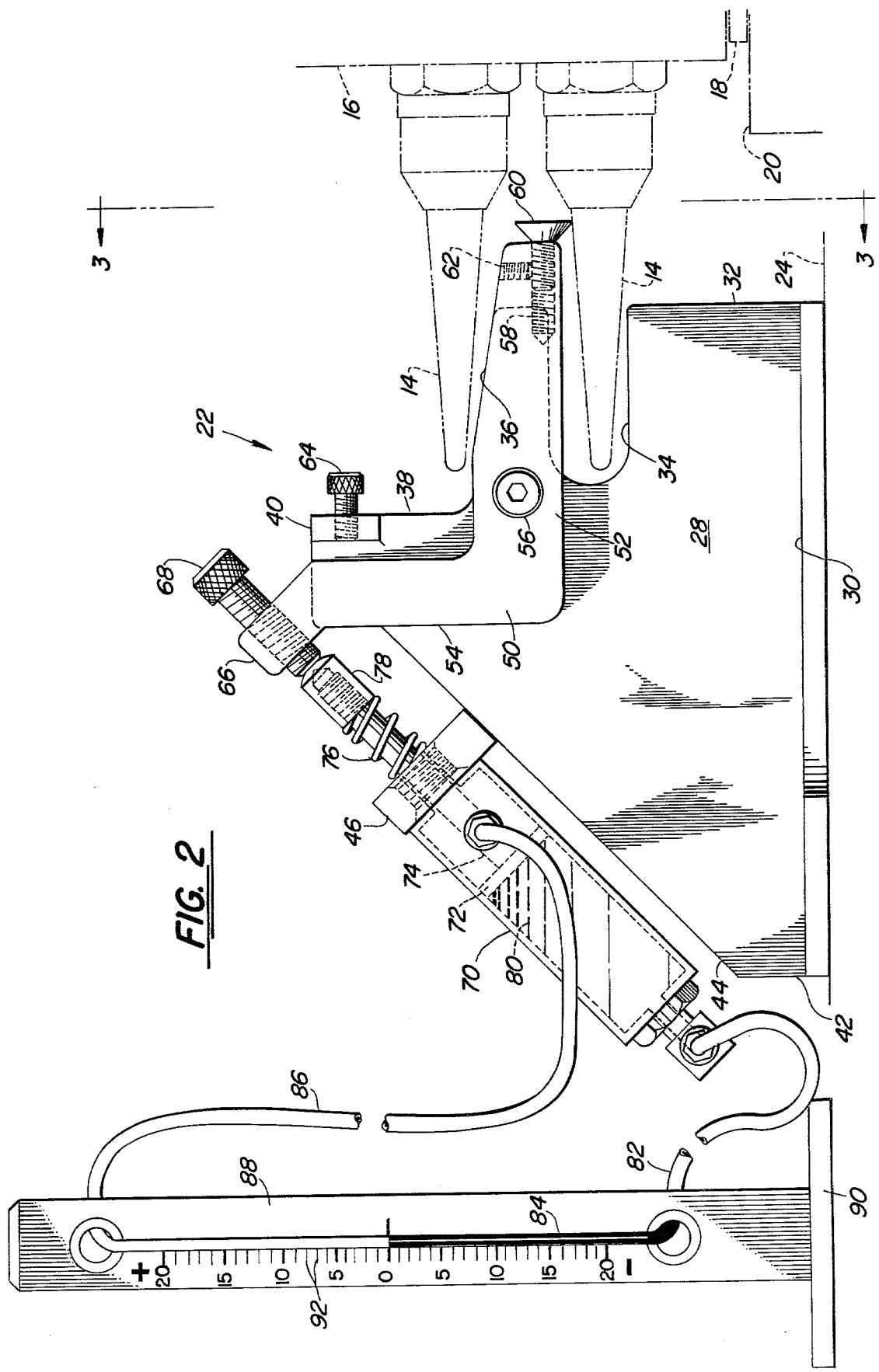
FIG. 2 is a side view partially broken away of the device shown in FIG. 1.

To check the spindle plane, a spindle gauge 22 is secured to the bottom 24 of the unit housing 12 by a clamp 26 or other suitable connecting means so that the gauge remains stationary with respect to the housing and there are no discrepancies in readings caused by gauge movement. As best seen in FIGS. 2 and 3 the gauge 22 includes a vertical support plate 28 connected to a horizontal base plate 30. The right end wall 32 as viewed in FIG. 2 extends upwardly from the base plate 30 to a notch 34 which receives the lowermost spindle 14 of each bar 16 as the drum 10 is rotated.

The end wall 32 terminates above the notch 34 and below the second lower spindle 14 in a generally horizontal wall 36. A vertical portion 38 extends upwardly from the wall 36 to the left (FIG. 2) of the plane to the spindle tips and terminates in a screw support 40 generally perpendicular to the plane of the vertical support plate 28.

The plate 28 includes a left end wall 42 (FIG. 2) and an upwardly angled wall 44 extending between the wall 42 and the portion 38. A cylinder support bracket 46 is welded to the wall 44 generally perpendicular to the wall and to the plate 28.

An L-shaped arm 50 includes a horizontal leg 52 and a vertical leg 54 pivotally connected above the inner end of the notch 34 to the plate 28 by a bolt 56. The bolt 56 extends through the plate 28 and through the leg 52 to the right (FIG. 2) of the juncture between the legs 52 and 54. The leg 52 is slightly tapered toward its end to permit the two lowermost spindles 14 of each bar 16 to pass on either side of it. The end of the leg 52 is tapped at 58 to receive a bolt 60, the head of which is adapted to ride over the lowermost spindle 14 of each bar 16 as the drum 10 is rotated. A set screw 62 is tightened against the threaded portion of the screw 60 to prevent the screw 60 from turning.

The leg 54 of the arm 50 extends upwardly and to the left (FIG. 2) of the screw support 40. A screw 64 is threaded through and is adjustable with respect to the support to contact the leg 54 and limit the clockwise pivoting of the arm 50 when the head of the screw 60 is not resting on a spindle 14.

The leg 54 terminates in a screw support 66 which is generally perpendicular to the inclined wall 44 and carries an adjusting screw 68 generally parallel to the wall 44. As the arm 50 pivots, the screw is moved along a path above and substantially parallel to the wall 44.

A hydraulic cylinder 70 is carried by the cylinder support bracket 46 so that its axis is parallel to the inclined wall 44. The cylinder 70 includes a piston 72 carried by an axially extending rod 74 which projects toward the adjusting screw 68. A spring 76 is carried on the rod 74 between the cylinder support bracket 46 and a tip member 78 screwed into the end of the rod. The spring 76 biases the rod 74 toward the screw support 66 so that the tip member 78 remains in contact with the adjusting screw 68. As the outer end of the leg 52 moves upwardly over a spindle, the arm 50 pivots to move the rod 72 downwardly against the bias of the spring 76. When the spindle 14 moves away from screw 60, the spring acts on the rod 74 to urge it against the screw 68 to cause the arm 50 to pivot in the clockwise direction.

A volume of fluid 80, which in the preferred embodiment is a mixture of diesel fuel and hydraulic fluid, is contained in the cylinder 70 below the piston 72. A long, flexible tube 82 connects the lower part of the cylinder below the piston 72 to the lower end of a narrow gauge tube 84. A flexible tube 86 connects the upper end of the gauge tube 84 with the upper end of the cylinder 70 above the piston 72. An upright, graduated gauge stand 88 having a horizontal base 90 supports the gauge tube 84 in an upright position. Movement of the piston 72 pumps fluid to or from the cylinder and causes the level of the fluid 80 in the gauge tube to change with respect to the graduations on the stand 88. The cross-sectional area of the piston 72 is much greater than that of the gauge tube 84 so that a small axial change in position of the piston 72 results in a relatively large change in the height of the column of fluid 80 in the gauge tube 84. The adjusting screw 68 can be extended or retracted to adjust the location of the piston 72 and thus the height of the fluid column in the gauge tube 84 for a given pivotal position of the arm 50. Preferably the screw 68 is adjusted so that when the first spindle or reference spindle 14 (FIG. 2) is directly under the screw 60, the fluid column will be midway (at the "zero" graduation) on the gauge tube. Thereafter when a corresponding spindle on a different bar 16 is positioned under the screw 60, the piston will move up or down with respect to the reference position if the spindle is lower or higher, respectively, than the first or reference spindle. If the second spindle 14 is lower than the first, the spring biased rod 74 is moved upwardly to pivot the arm in the clockwise direction until the screw 60 rests on the spindle 14. The piston 72 moves upwardly with the rod 74 and draws fluid 80 from the gauge tube 84 through the tube 82 to cause the height of the fluid column in the gauge tube to drop. If a spindle 14 is higher than the reference spindle, the arm 50 pivots counterclockwise with respect to its reference position so that the screw 68 depresses the rod 74 and piston 72 to displace fluid from the cylinder 70 into the tubes 82 and 84 thereby increasing the height of the fluid column in the gauge tube 84. In the preferred embodiment, the distance between two graduations 82 represents a 0.001 inch change in elevation of the screw 60. Therefore the deviation in spindle height between two spindles 14 can be easily and quickly determined by comparing the corresponding two gauge readings. The bars 16 can then be moved up or down relative to each other by inserting the proper shims 18 between the plate 20 and the bars 16 to decrease the deviation.

The connecting tubes 82 and 86 are sufficiently long so that the gauge stand 88 can be easily placed at a location remote from the cylinder 70 for convenient reading of the fluid column height in the gauge tube 84. Connecting the top of the gauge tube 84 through the line 86 to the top of the cylinder 70 above the piston 72 provides a closed system to decrease the liklihood of a compressible air pocket in the fluid and to prevent fluid contamination. The screw 60 provides an inexpensive and easily replaced wear location on the arm 50. The screw 64 is threaded through the support 40 toward the rear of the leg 54 to limit the pivoting of the arm 50 in the clockwise direction as the spindle 14 is moved away from the arm so that the screw 60 does not drop below the level where it can still ride up over the spindle 14 on the next bar 16 as the drum is rotated. Once the gauge 22 is positioned and adjusted for the reference spindle 14, no further movement or adjustment of the gauge is required for checking all the bars 16 on the drum 10.

To check the spindle plane on a harvester, the unit drive belts for the picker unit are first loosened so that the picker bar drum 10 can be turned by manually rotating the doffer column. The gauge 22 is then secured to the bottom 24 of the picker unit housing 12 by the clamp 26. The picker bar drum 10 is rotated until a spindle 14 is under the screw 60 on the arm 50. The screw 64 is adjusted so that the head of the gauge screw 60 just touches the smooth portion of the spindle 14 just in front of the spindle nut. The knob 68 is adjusted to obtain a reading of "zero" on the gauge tube 84. The picker bar drum 10 is rotated one revolution, with a gauge reading taken at each picker bar 16. The picker bars 16 are then shimmed with shims 18 to obtain as near zero deviation as possible between the bars and to assure that the deviation from the highest to lowest bar 16 is less than a predetermined maximum which in a typical picker is 0.012 inch or less. The gauge is accurate to less the 0.001 inch so that the deviation in spindle height and thus picker bar height can be very accurately determined. The operator does not have to hold the gauge 22 or carefully reposition it for each bar 16 on the drum 10, decreasing the time required for a spindle plane check.

Having described the preferred embodiment, it will be apparent that modifications can be made without departing from the scope of the invention as defined in the accompanying claims.

We claim:

1. For a cotton harvester which includes a rotatable picker drum carried in a picker unit housing and having a plurality of vertically adjustable upright spindle-supporting bars defining spaced columns of picker spindles, each column of spindles movable vertically with the corresponding bar as it is adjusted, each spindle moving in a generally horizontal path as the drum is rotated with corresponding spindles on adjacent bars moving in approximately the same path, a device for checking the relative height of the spindle supporting bars, comprising:

a support comprising a base adapted for support by the unit housing, and upright structure connected to the base;

means for fixing the base with respect to the unit housing with the upright structure located adjacent the path of a preselected set of spindles;

spindle sensing means movably supported by the upright structure in said path for sensing the vertical location of each said spindle on each bar relative to the housing as the picker drum is rotated;

stop means limiting the vertical movement of the spindle sensing means and maintaining the latter in substantial alignment with the spindles in the path when in a non-contacting relationship between adjacent columns of spindles for permitting each spindle in the path to move the spindle sensing means as the picker drum is rotated a complete revolution;

indicator means operably associated with the sensing means and responsive to the vertical movement of said sensing means for providing an indication of the relative vertical position of each of the preselected spindles.

2. The device as set forth in claim 1 wherein the sensing means comprises an arm member supported in the path of the preselected spindles and positionable in response to the movement of the preselected spindle in the path.

3. The device as set forth in claim 2 wherein the sensing means further comprises a cylinder responsive to the position of the arm member for displacing fluid in proportion to the sensed location of the preselected spindle.

4. The device as set forth in claim 3 wherein the indicator means comprises a gauge tube connected by a length of flexible tubing to the cylinder so that the indicator means is remotely locatable with respect to the sensing means.

5. For a cotton harvester which includes a rotatable picker drum carried in a picker unit housing and having a plurality of upright spindle-supporting bars defining spaced columns of picker spindles with corresponding spindles on different bars at generally the same height, each spindle moving in a generally horizontal path as the drum is rotated, a device for checking spindle height, comprising:

support structure including a base member, and an arm support connected to the base member;

means for fixing the support structure to the unit housing with the arm support adjacent the path of preselected corresponding spindles;

a mechanical sensor carried by the arm support adjacent the path of the preselected corresponding spindles and including vertically movable spindle contacting means for sensing the vertical location of each spindle in the path passing thereby as the drum is rotated;

stop means limiting the movement of the spindle-contacting means and maintaining the latter in substantial alignment with the spindles in the path when in non-contacting relationship between adjacent columns of spindles for permitting each spindle in the path to move the spindle-contacting means as the drum is rotated a complete revolution;

fluid means operably assiciated with, and responsive to the vertical spindle location sensed by, the mechanical sensor for providing an indication of the relative spindle height of each spindle in the path.

6. The device as set forth in claim 5 wherein the fluid means comprises a fluid-filled cylinder in fluid communication with a gauge tube.

7. The device as set forth in claim 6 wherein the cylinder has a relatively large cross-sectional area as compared with the gauge tube and includes piston means operably connected to the spindle contacting means for displacing fluid in the gauge tube in proportion to changes in the sensed location of the spindles.

8. The gauge as set forth in claim 6 includes a flexible conduit means for connecting the gauge tube and cylinder and for permitting the gauge tube to be located remotely from the cylinder.

9. The gauge as set forth in claim 6 wherein the mechanical sensor includes adjustment means for varying the displacement of the fluid for a given spindle height to provide a preselected gauge means indication for the given spindle height.

10. A gauge for checking the relative height of vertically adjustable spindle-carrying picker bars spaced apart on a rotatable picker drum supported in a picker unit housing wherein the picker bars are substantially identical, with spindles spaced vertically on the bars in substantially identical fashion so that corresponding spindles on the bars are at the same height when the bars are properly adjusted, said gauge comprising:

a support selectively fixed to the unit housing adjacent the picker drum;

an arm member rockably mounted on the support and including a first portion extending into the path of preselected corresponding spindles, said portion adapted for vertical movement by a preselected spindle of each picker bar a distance dependent on the height of the spindle relative to the housing;

stop means adjustably mounted on the support for contacting the arm member and preventing the first portion from moving out of the path as the picker drum is rotated a complete revolution;

a fluid cylinder carried by the support and including a piston operably connected to and movable by the arm member as the latter rocks with the vertical movement of the first portion; and indicator means in fluid communication with the cylinder and responsive to the movement of the piston for providing an indication of relative height of each of the preselected spindles.

11. The gauge as set forth in claim 10 further comprising flexible conduit means connected between the indicator means and the fluid cylinder for permitting the indicator means to be remotely located with respect to the support.

12. The gauge as set forth in claim 10 further comprising means connected between the arm member and the piston for adjusting the position of the piston with respect to the arm member to provide a preselected height indication for one of the preselected spindles.

13. The gauge as set forth in claim 10 wherein the indicator means comprises a gauge tube having fluid movable therein in response to the movement of the piston.

14. The gauge as set forth in claim 15 wherein the piston has a first cross-sectional area and the gauge tube has a cross-sectional area substantially less than the first area so that relatively small movement of the piston is translated into a much larger movement of the fluid in the tube.

15. The gauge as set forth in claim 10 wherein the first portion includes contact means extending into a path described by the preselected spindles and contacting the spindles adjacent their connections to the picker bars.

* * * * *

UNITED STATES PATENT AND TRADEMARK OFFICE
CERTIFICATE OF CORRECTION

PATENT NO. : 4,326,369

DATED : 27 April 1982

INVENTOR(S) : Merl S. Schillerstrom and Robert A. Tufts

It is certified that error appears in the above-identified patent and that said Letters Patent is hereby corrected as shown below:

Column 6, line 47, delete "means".

Column 8, line 7, delete "15" and insert -- 13 --.

Signed and Sealed this

Twenty-fourth Day of May 1983

[SEAL]

Attest:

DONALD J. QUIGG

Attesting Officer  Acting Commissioner of Patents and Trademarks